(12) United States Patent
Sampath

(10) Patent No.: US 10,329,985 B2
(45) Date of Patent: Jun. 25, 2019

(54) IMPINGEMENT MIXER FOR EXHAUST TREATMENT

(71) Applicant: Tenneco Automotive Operating Company Inc., Lake Forest, IL (US)

(72) Inventor: Manoj K. Sampath, Ann Arbor, MI (US)

(73) Assignee: Tenneco Automotive Operating Company Inc., Lake Forest, IL (US)

( * ) Notice: Subject to any disclaimer, the term of this patent is extended or adjusted under 35 U.S.C. 154(b) by 63 days.

(21) Appl. No.: 15/634,402

(22) Filed: Jun. 27, 2017

(65) Prior Publication Data

US 2018/0371978 A1    Dec. 27, 2018

(51) Int. Cl.
*F01N 3/20* (2006.01)
*F01N 3/28* (2006.01)
*F01N 5/02* (2006.01)

(52) U.S. Cl.
CPC ......... *F01N 3/2892* (2013.01); *F01N 3/2066* (2013.01); *F01N 5/025* (2013.01)

(58) Field of Classification Search
CPC ....... F01N 3/2892; F01N 3/2066; F01N 5/025
See application file for complete search history.

(56) References Cited

U.S. PATENT DOCUMENTS

| | | | |
|---|---|---|---|
| 4,865,460 A | 9/1989 | Friedrich | |
| 5,423,904 A * | 6/1995 | Dasgupta | B01D 46/0023 55/282 |
| 7,997,327 B2 | 8/2011 | Bucher et al. | |
| 2010/0251701 A1 | 10/2010 | Chabry | |
| 2013/0298539 A1 | 11/2013 | Jang | |
| 2017/0016371 A1* | 1/2017 | Schlipf | H05B 3/48 |
| 2017/0138243 A1 | 5/2017 | Zhang | |

FOREIGN PATENT DOCUMENTS

| | | |
|---|---|---|
| DE | 102016109418 A1 | 1/2017 |
| WO | WO-199945247 A1 | 9/1999 |
| WO | WO-200240839 A1 | 5/2002 |
| WO | WO-2009085641 A1 | 7/2009 |
| WO | WO-2011000684 A1 | 1/2011 |
| WO | WO-2011116840 A1 | 9/2011 |

* cited by examiner

*Primary Examiner* — Brandon D Lee
(74) *Attorney, Agent, or Firm* — Harness, Dickey & Pierce, P.L.C.

(57) ABSTRACT

A mixer assembly for treating exhaust with an injected reductant as the exhaust flows through an exhaust gas passageway includes a tubular shell and a rod. A first end and a second opposite end of the rod are fixed to the shell. The rod has a serpentine shape with a plurality of parallel extending portions interconnected by curved portions. The curved portions are positioned proximate an inner surface of the shell such that the rod traverses the exhaust passageway. The mixer assembly is positioned such that the rod is directly impinged by reductant injected into the exhaust gas passageway.

20 Claims, 6 Drawing Sheets

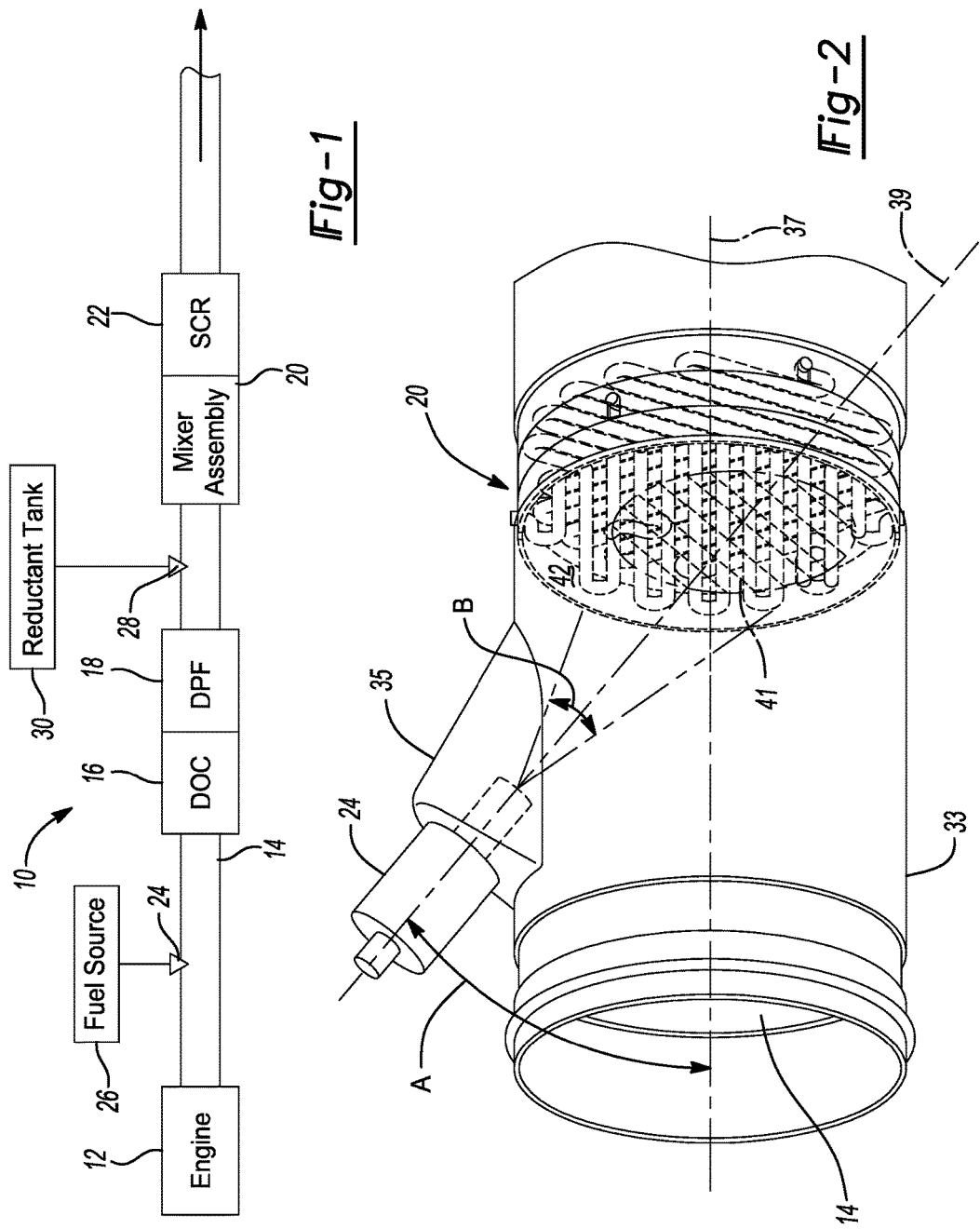

IMPINGEMENT MIXER FOR EXHAUST TREATMENT

FIELD

The present disclosure relates to an impingement mixer for an exhaust aftertreatment system.

BACKGROUND

This section provides background information related to the present disclosure and is not necessarily prior art.

Selective catalytic reduction technology has been used in conjunction with reducing nitrogen oxides present in the exhaust of combustion engines. Many vehicles utilizing combustion engines are equipped with exhaust aftertreatment devices for reducing nitrogen oxide emissions. Some of these systems include a reductant delivery system for transmitting the reductant (e.g., urea) from a tank to the exhaust stream. A mixer may be provided for mixing the injected reductant with the exhaust gas before the reductant reaches a catalyst with which the reductant reacts.

Some mixers are positioned in the flow path of the injected reductant and are categorized as impingement mixers. Normally impingement mixers include structures with relatively sharp edges that include a surface roughness. The geometry of the known mixers may result in wall film formation which increases the time required to atomize injected reductant. Wall firm formation may also lead to urea deposits being formed on the mixer or on an interior wall surface of the conduit in which the mixer is positioned. While these systems may have performed well in the past, it may be desirable to provide an improved mixing system that is able to fit in a limited packaging space while reducing wall firm formation to more efficiently and effectively mix the reductant with the exhaust stream before the mixture reaches a catalyst.

SUMMARY

This section provides a general summary of the disclosure, and is not a comprehensive disclosure of its full scope or all of its features.

A mixer assembly for treating exhaust with an injected reductant as the exhaust flows through an exhaust gas passageway includes a tubular shell and a rod. A first end and a second opposite end of the rod are fixed to the shell. The rod has a serpentine shape with a plurality of parallel extending portions interconnected by curved portions. The curved portions are positioned proximate an inner surface of the shell such that the rod traverses the exhaust passageway. The mixer assembly is positioned such that the rod is directly impinged by reductant injected into the exhaust gas passageway.

In another arrangement, a mixer assembly includes a rigid first rod, a rigid second rod, and a rigid third rod fixed to the shell. Each rod is substantially the same and includes a serpentine shape between a first end and a second end. The first rod extends along a first plane perpendicular to the shell axis. The second rod extends along a second plane perpendicular to the shell axis, and the third rod extends along a third plane perpendicular to the shell axis. The first rod includes linear parallel portions extending at an angle relative to linear parallel portions of the second rod.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 1 is a schematic representation of an exhaust aftertreatment system having a mixer assembly according to the principles of the present disclosure;

FIG. 2 is a perspective view of a mixer assembly installed in an exhaust gas passageway;

Corresponding reference numerals indicate corresponding parts throughout the several views of the drawings.

DETAILED DESCRIPTION

Figure 3:
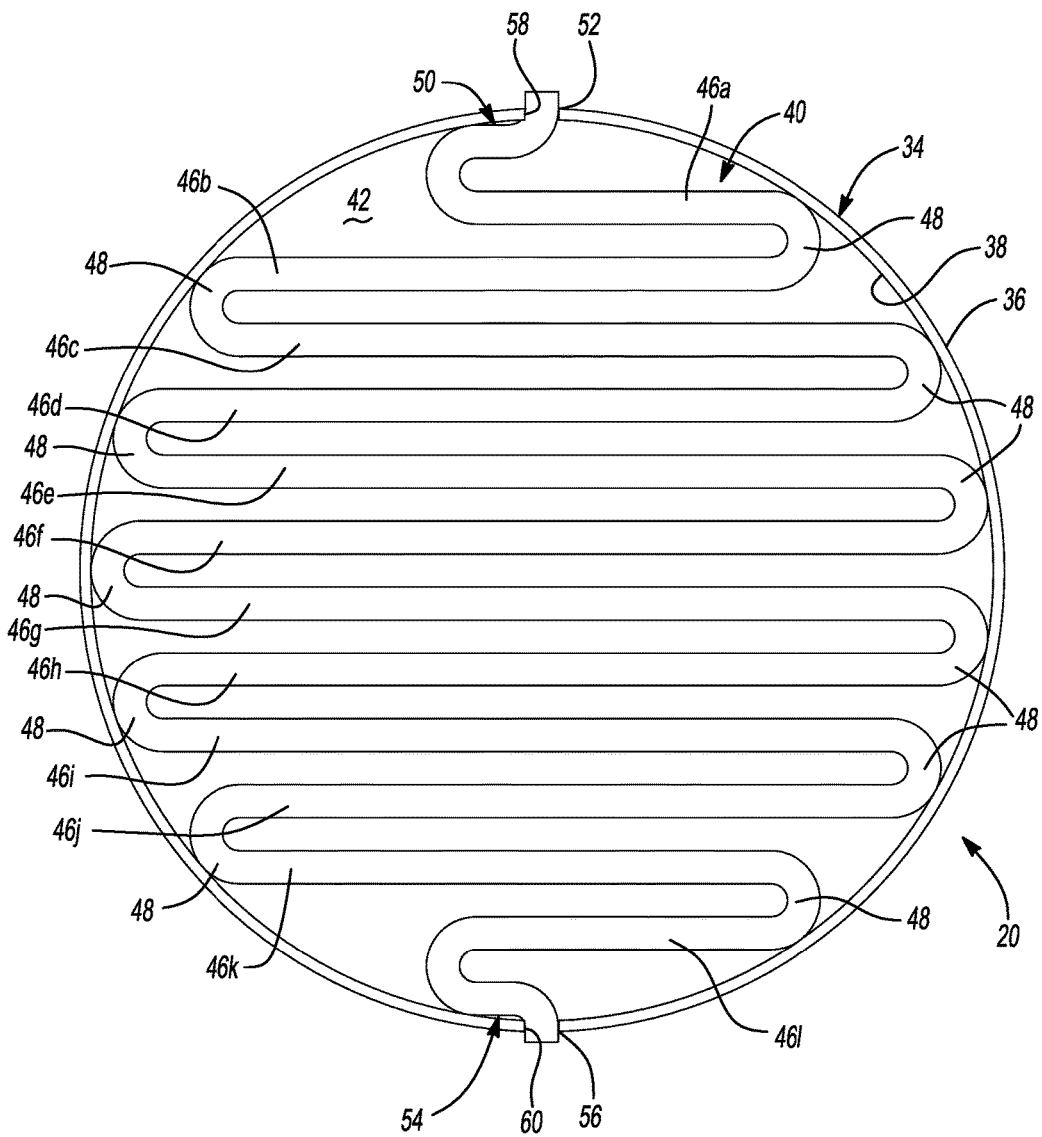
FIG. 3 is a plan view of another mixer assembly.

Example embodiments will now be described more fully with reference to the accompanying drawings.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

With reference to FIG. 1, an exhaust aftertreatment system 10 is provided that may treat exhaust gas output by a combustion engine 12. The exhaust aftertreatment system 10 may include an exhaust gas passageway 14, an oxidation catalyst (e.g., a diesel oxidation catalyst or DOC) 16, a filter (e.g., a diesel particulate filter (DPF)) 18, a mixer assembly 20 and a selective catalytic reduction (SCR) catalyst 22. The DOC 16, filter 18, mixer assembly 20 and SCR catalyst 22 are disposed within the exhaust gas passageway 14 such that some or all of the exhaust gas output from engine 12 flows therethrough.

A hydrocarbon (HC) injector 24 may be disposed in or adjacent to the exhaust gas passageway 14 at a location upstream of the DOC 16. The HC injector 24 may receive hydrocarbon fuel from a fuel source 26 and may inject the fuel into the stream of exhaust gas upstream of the DOC 16. A burner (not shown) may be disposed at least partially within the exhaust gas passageway 14 upstream of the DOC 16 at or adjacent the HC injector 24. The burner may ignite the fuel injected by the HC injector 24 to regenerate the DOC 16 and/or the filter 18.

A reductant injector 28 may be disposed in or adjacent to the exhaust gas passageway 14 at a location upstream of the mixer assembly 20, which is upstream of the SCR catalyst 22. The reductant injector 28 may receive a reductant (e.g., urea) from a reductant tank 30 and inject the reductant into an exhaust stream upstream of or in the mixer assembly 20. The reductant may mix with exhaust gas within the mixer assembly 20 prior to flowing through the SCR catalyst 22.

The mixer assembly 20 may be positioned directly in the injected reductant path such that all or a substantial majority of the injected reductant impinges on a surface of mixer assembly 20 prior to impacting an inner surface 32 of exhaust passageway 14 or SCR catalyst 22.

A portion of an exemplary exhaust aftertreatment system 10 is depicted in greater detail at FIG. 2. Injector 24 may be mounted to a conduit 33 defining exhaust gas passageway 14. Conduit 33 may include a radially outwardly extending protrusion 35 that provides a mount for injector 24. Injector 24 is operable to inject reductant along an axis 37 that extends at an angle A ranging from 30 to 60 degrees relative to a longitudinal axis of exhaust flow 39. Depending on the type of injector utilized, the reductant may form one or more conically-shaped spray cones. Included angle B of the spray cone may range from 20 to 60 degrees. A coverage zone 41 is indicated as an oval shaped pattern produced by the reductant as reductant impinges an upstream surface of mixer assembly 30. It is desirable for the area of coverage zone 41 to be at least 50% of a cross-sectional area 42 defined by mixer assembly 20.

Referring to FIG. 3, mixer assembly 20 is depicted in greater detail. Mixer assembly 20 includes a cylindrical shell 34 including an outer surface 36 and an inner surface 38. Cylindrical shell 34 is an uninterrupted ring sized to fit within exhaust passageway 14 such that outer surface 36 closely conforms to inner surface 32 of exhaust passageway 14 (FIG. 2). A single, monolithic, uninterrupted rod 40 includes a serpentine shape to block a substantial portion of the cross-sectional area 42 defined by inner surface 38 of shell 34.

Rod 40 may be configured as a solid or hollow element. The cross-sectional shape of rod 40 is circular such that the mixer does not include sharp edges that may promote wall film formation. Rod 40 includes a plurality of transversely extending linear portions 46a through 46l that extend substantially parallel to one another. Each linear portion 46 is interconnected at one end by a curved portion 48 that extends 180 degrees. Curved portions 48 are preferably spaced apart from shell 34. Adjacent linear portions 46 may be spaced apart from one another a distance equal to or greater than a diameter of the rod. A first terminal end portion 50 of rod 40 is fixedly coupled to shell 34 at a first mounting point 52. A second and opposite terminal end portion 54 of rod 40 is fixed to shell 34 at a diametrically opposed location 56. It is contemplated that a portion of end 50 and a portion of end 54 may protrude through apertures 58, 60 extending through shell 34. The protruding ends may be subsequently trimmed after rod 40 is fixed to shell 34 to assure fitment within shell 34.

It is envisioned that apertures 58, 60 may be cylindrically shaped extending through the wall of shell 34. As an alternate configuration, apertures 58, 60 may be shaped as slots to allow the relatively rigid serpentine rod 40 to be axially translated into shell 34 and subsequently coupled thereto.

Rod 40 may be fixed to shell 34 at only the two opposed locations via any number of processes including welding, adhesive bonding, mechanical fastening, or the like. If additional support is required, shell 34 may be deformed at one or more areas to contact curved portions 48 and support rod 40. In another alternate arrangement, the curved portions 48 may be positioned adjacent to or in engagement with shell 34. A weld may be formed between rod 40 and shell 34 at one or more positions. Apertures may extend through shell 34 at the location of curved portions 48 to allow a puddle weld to be formed. It should be appreciated that each of the linear portions 46a through 46l and curved end portions 48 lie in a common plane oriented transversely to a direction of exhaust flow along axis 39 and through exhaust gas passageway 14.

Figure 3A:
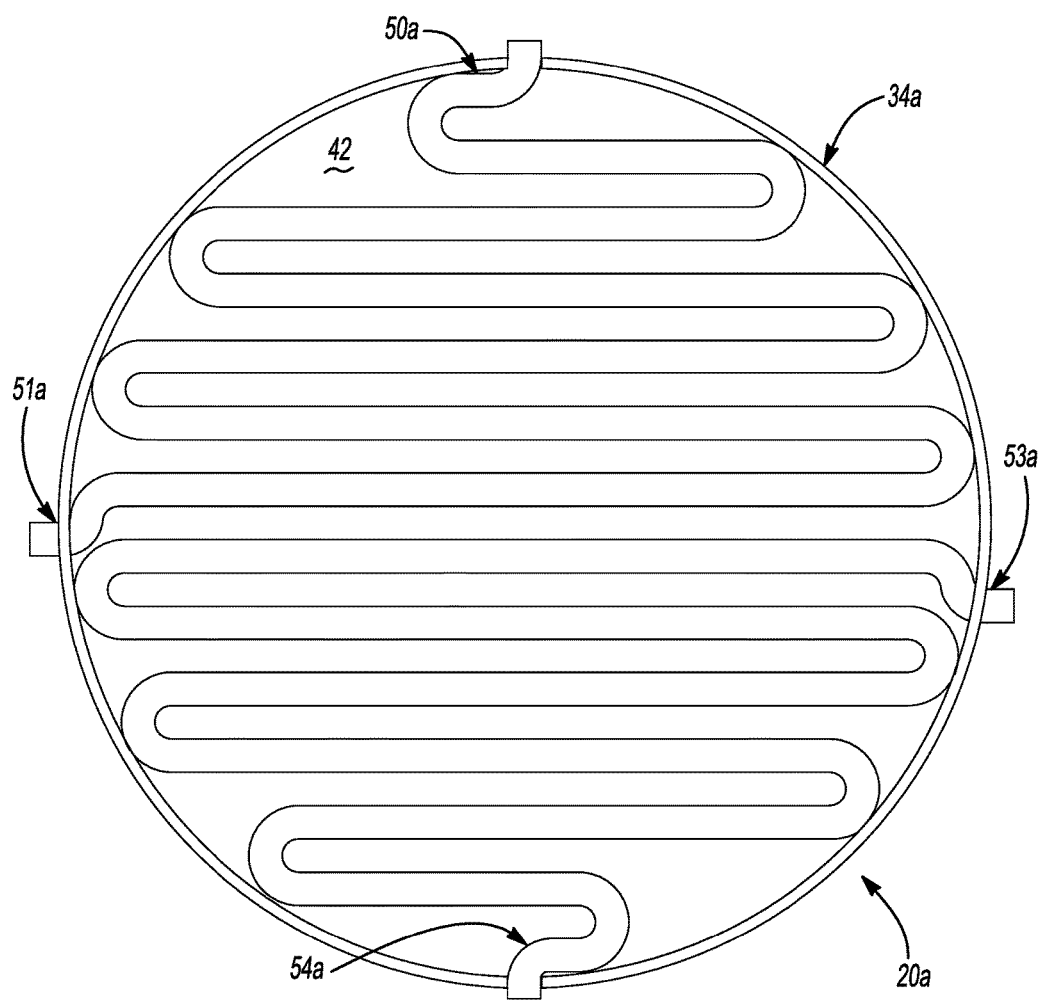
FIG. 3A is a plan view of another mixer assembly.

An alternate mixer assembly 20a is shown in FIG. 3A that includes two uninterrupted rods 40a, 40b, to replace the singular rod 40. The first rod 40a includes a first terminal end portion 50a at the 12 o'clock position and includes a second terminal end portion 51a coupled to shell 34a at the 9 o'clock position. The second rod 40b includes a first terminal end portion 54a fixed to shell 34 at the 6 o'clock position and an opposite second terminal end portion 53a fixed to shell 34a at the 3 o'clock position.

Figure 4:
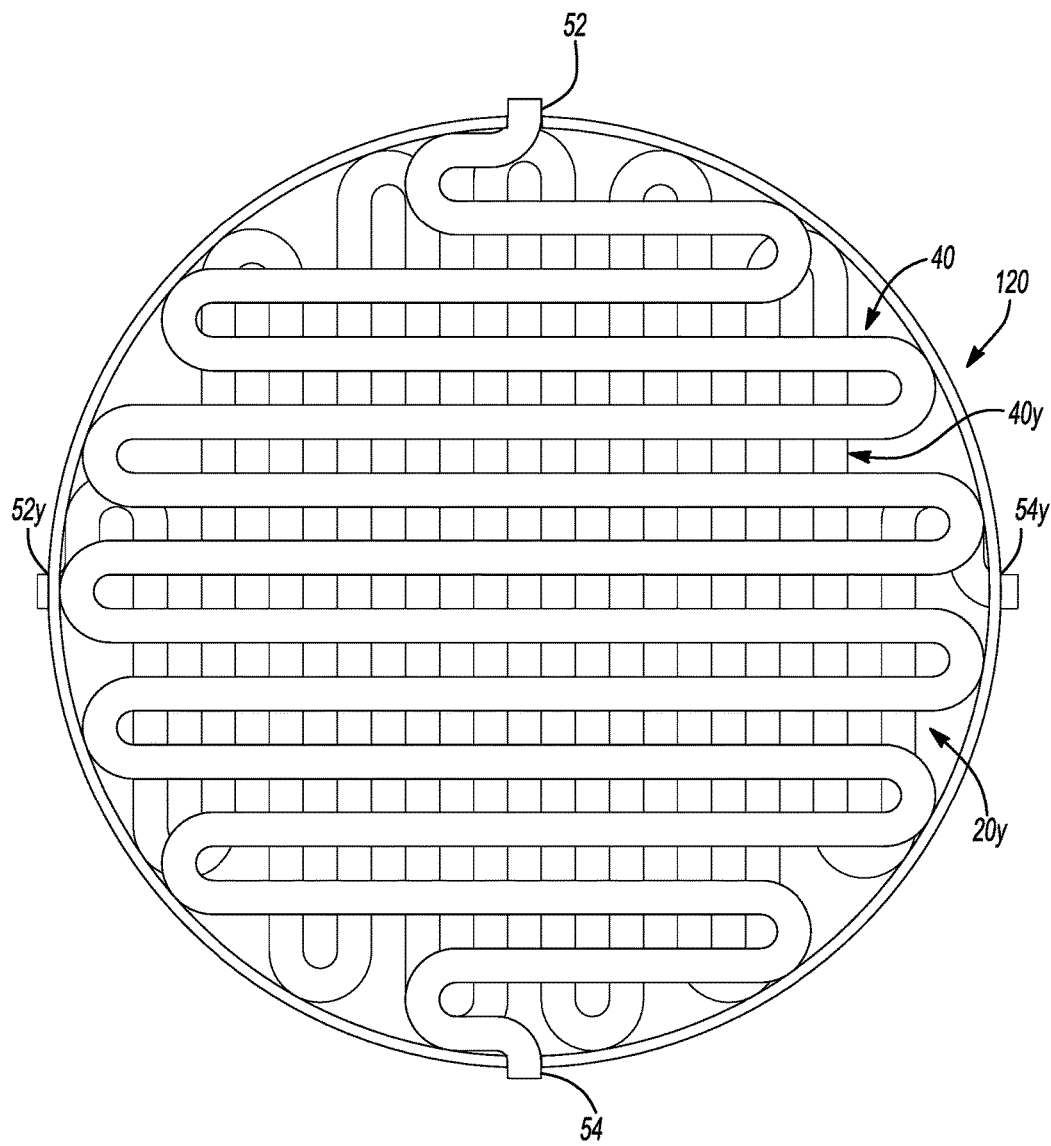
FIG. 4 is a plan view of another mixer assembly.

FIG. 4 depicts an alternate mixer assembly 120. Mixer assembly 120 comprises mixer assembly 20 coupled to another mixer assembly identified by reference numeral 20y. Mixer assembly 20y is substantially the same as mixer assembly 20. Accordingly, mixer assembly 20y will not be described in detail. For identification purposes in FIG. 3, elements of mixer assembly 20y will be identified with a "y" suffix. Mixer assembly 120 is formed by coupling shell 34 to shell 34y after the linear portions 46a through 46l and 46ay through 46ly are oriented at 90 degrees to one another. In this manner, connection 52 is positioned at the top of the Figure, connection 54 is at the bottom of the Figure, a connection 52y is at the leftmost portion of the Figure and opposite end connection 54y is diametrically opposed at the rightmost portion of the Figure. A crisscross pattern is provided to increase the likelihood of injected reductant impinging upon a surface of rod 40 and/or rod 40y. As rod 40y is axially spaced apart and downstream from rod 40, the pressure drop across mixer assembly 120 is minimized. Because the mixer is comprised of circular rods having minimal surface roughness, the formation of urea deposits is reduced significantly. The pressure drop across mixer assembly 20 and/or mixer assembly 120 is reduced as the leading edge of rods 40, 40y are curved.

Figure 5:
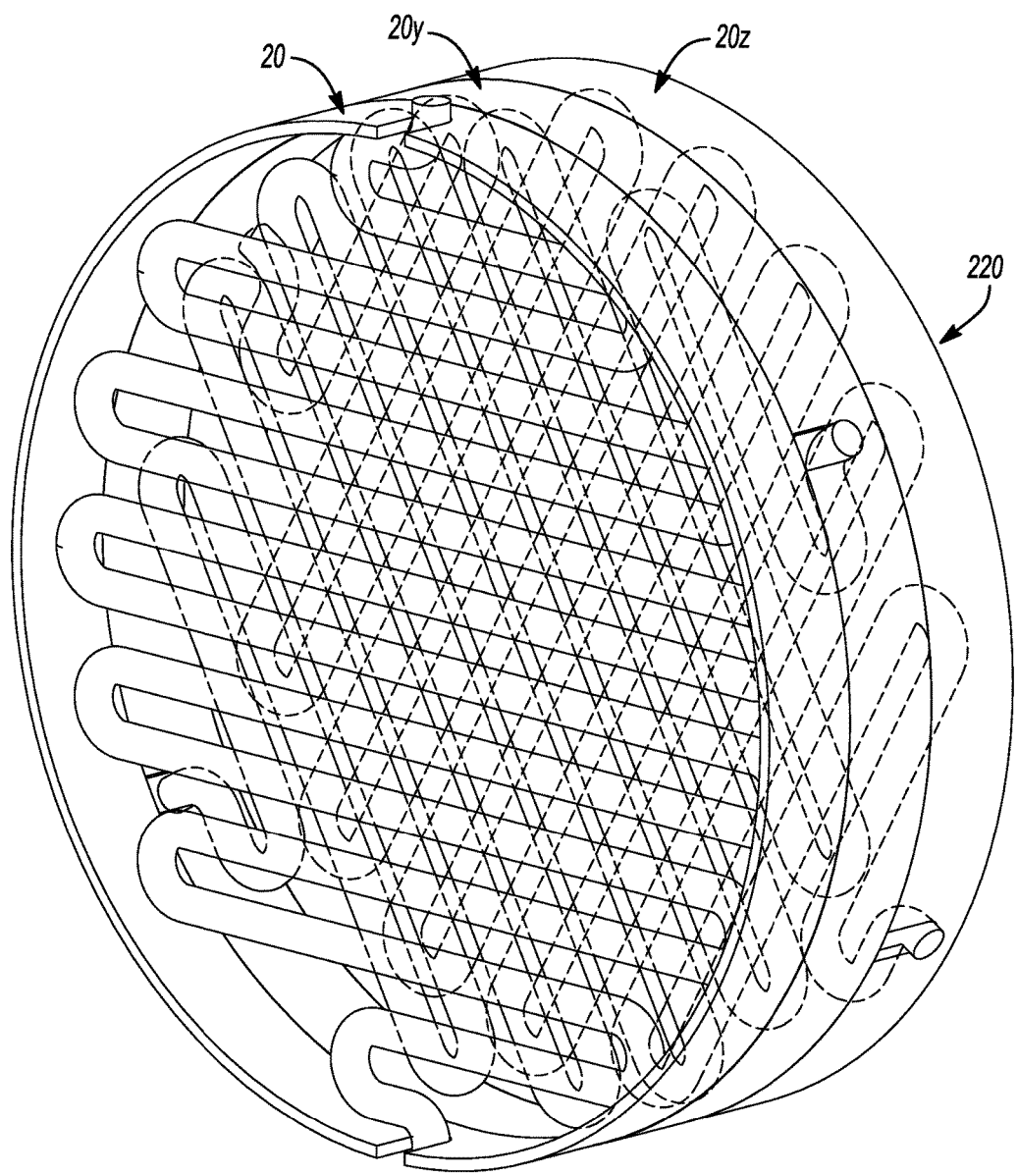
FIG. 5 is a perspective view of another mixer assembly.
Figure 6:
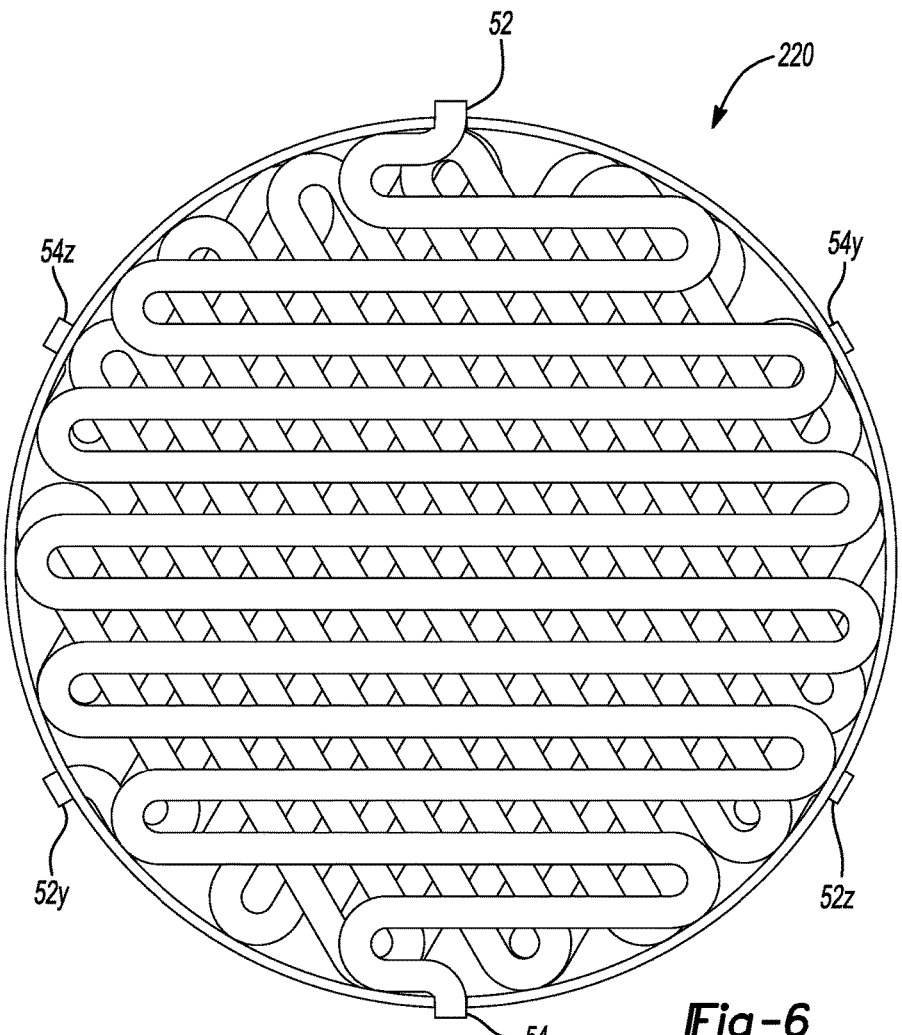
FIG. 6 is a plan view of the mixer assembly shown in FIG. 5.

FIGS. 5 and 6 depict another mixer assembly identified at reference numeral 220. Mixer assembly 220 is substantially similar to mixer assembly 120 except that three mixers assemblies 20 are coupled to one another, positioned in series, and adjacent to one another. More particularly, mixer assembly 220 includes mixer assembly 20, mixer assembly 20y, and a mixer assembly 20z. Mixer assembly 20z is substantially the same as mixer assemblies 20 and 20y. Mixer assembly 220 orients the parallel rod portions of each mixer relative to one another at a 120 degree relative orientation. Once again, the relative orientation between the mixers may be easily envisioned by noting the connection points of the rods to the shells where the pairs of attachments points for each rod are shown as (52, 54), (52y, 54y) and (52z, 54z). The arrangement of three adjacent mixers to define mixer assembly 220 increases the amount of area 42 that is blocked by rods 40, 40y, 40z. As previously noted, this increases the likelihood that injected reductant will impinge upon one or more of these rods. Pressure drop across mixer assembly 220 is minimized by the angular orientation of the rods to one another, the axially spaced apart positioning of the rods and the circular cross-sectional shape of each of the rods.

Figures 7, 8, 9:
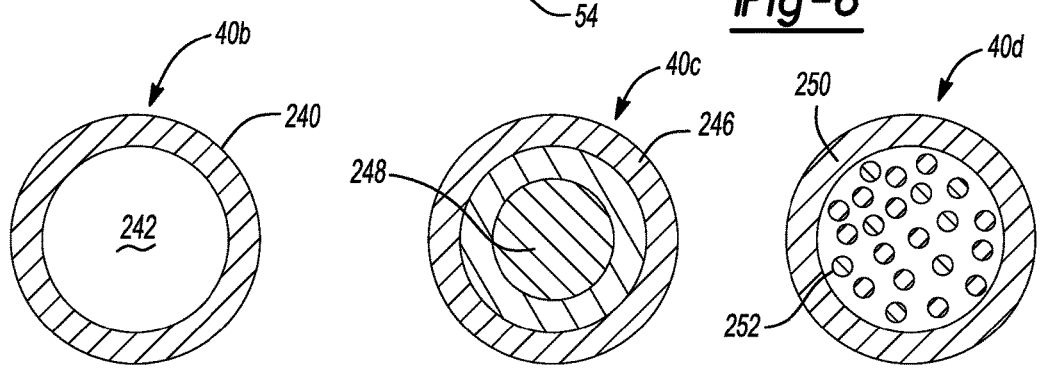
FIG. 7 is a cross-sectional view through a rod of another mixer assembly.
FIG. 8 is a cross-sectional view through a rod of another mixer assembly.
FIG. 9 is a cross-sectional view through a rod of another mixer assembly.

FIG. 7 depicts a cross-sectional view taken through one of the linear portions of an alternate rod 40b. Rod 40b may replace any of the previously described rods that have a solid cross-section. Rod 40b is hollow and includes a thin wall 240 surrounding an air core 242. Alternatively, air core 242 may be replaced with an insulation material. Another alternate configuration rod is depicted at reference numeral 40c in FIG. 8. Rod 40c includes a hollow tube 246 surrounding an electrical resistive heater wire 248. Heater wire 248 may be selectively energized to transfer heat to hollow tube 246. By heating rod 40c, evaporation and atomization of the injected reductant is enhanced.

FIG. 9 depicts yet another alternate rod identified as element 40d. Rod 40d includes a hollow tube 250 surrounding a plurality of dissimilar conductors 252. When a thermal gradient is formed between the two dissimilar conductors 252, electricity is produced. As such, rod 40d functions as a thermoelectric generator when exposed to a heat source.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A mixer assembly for treating exhaust with an injected reductant as the exhaust flows through an exhaust gas passageway, comprising:
   a first tubular shell;
   a first rod, the first shell being adapted for positioning within the exhaust gas passageway, the first rod including a first end and a diametrically opposed second end, the first end and the second end being fixed to the first shell, the first rod having a serpentine shape with a plurality of parallel extending portions interconnected by curved portions, wherein the curved portions are positioned proximate an inner surface of the first shell such that the first rod traverses the exhaust passageway and extends across substantially the entire exhaust gas passageway, the mixer assembly being positioned such that the first rod is adapted to be directly impinged by reductant injected into the exhaust gas passageway; and
   a second shell and a second rod, the second shell being coaxially aligned and fixed to the second shell, the second rod being fixed to the second shell and including parallel extending portions oriented in a non-parallel manner in relation to the parallel extending portions of the first rod.

2. The mixer assembly of claim 1, wherein the first rod is only coupled to the shell at the first and second ends.

3. The mixer assembly of claim 1, wherein the first rod includes a constant cross-sectional shape and size along its length.

4. The mixer assembly of claim 1, wherein the parallel extending portions of the first rod each include a circular cross-sectional shape and have a common diameter.

5. The mixer assembly of claim 4, wherein the parallel extending portions of the first rod are spaced apart from one another a distance equal to or greater than the common diameter.

6. The mixer assembly of claim 1, wherein the first rod is solid.

7. The mixer assembly of claim 1, wherein the first rod is hollow.

8. The mixer assembly of claim 7, wherein the first rod surrounds a heating element.

9. The mixer assembly of claim 7, wherein the first rod surrounds a thermoelectric generator.

10. The mixer assembly of claim 1, wherein the passageway defines a longitudinal axis of exhaust gas flow, the reductant being injected along an axis that intersects the longitudinal axis and an inlet face of the mixer assembly.

11. The mixer assembly of claim 10, wherein the injected reductant is dispersed to impact a coverage zone at an inlet of the mixer assembly, the coverage zone having an area fifty percent or more than an inlet cross-sectional area of the mixer assembly.

12. The mixer assembly of claim 1, wherein the second rod has a similar size and shape as the first rod.

13. The mixer assembly of claim 1, wherein the shell includes an outer diameter sized to compliment an inner diameter of the exhaust gas passageway.

14. A mixer assembly for treating exhaust with an injected reductant as the exhaust flow through an exhaust gas passageway, comprising:
 a tubular shell having an axis; and
 a rigid first rod, a rigid second rod, and a rigid third rod fixed to the shell, each rod including a serpentine shape between a first end and a diametrically opposed second end, wherein the first rod extends along a first plane perpendicular to the shell axis and substantially entirely across the exhaust gas passageway, the second rod extends along a second plane perpendicular to the shell axis and axially spaced apart from the first plane, and the third rod extends along a third plane perpendicular to the shell axis and axially spaced apart from the second plane, wherein the first rod includes linear parallel portions extending at an angle relative to linear parallel portions of the second rod.

15. The mixer assembly of claim 14, wherein the shell includes a first tube, a second tube and a third tube coaxially aligned and fixed to one another.

16. The mixer assembly of claim 15, wherein the first tube includes slots in receipt of end portions of the first rod.

17. The mixer assembly of claim 16, wherein the linear parallel portions each include a circular cross-sectional shape and have a common diameter.

18. The mixer assembly of claim 17, wherein the linear parallel portions are spaced apart from one another a distance equal to or greater than the common diameter.

19. The mixer assembly of claim 14, wherein the first rod is hollow and surrounds a heating element.

20. The mixer assembly of claim 14, wherein the passageway defines a longitudinal axis of exhaust flow, the reductant being injected along an axis that intersects the longitudinal axis and an inlet face of the mixer assembly.

* * * * *